United States Patent [19]

Slattery et al.

[11] Patent Number: 5,455,004
[45] Date of Patent: Oct. 3, 1995

[54] LEAD-FREE ALLOY CONTAINING TIN, ZINC, INDIUM AND BISMUTH

[75] Inventors: James A. Slattery, Sauquoit; John R. Sovinsky, Liverpool, both of N.Y.

[73] Assignee: The Indium Corporation of America, New York, N.Y.

[21] Appl. No.: 264,186

[22] Filed: Jun. 22, 1994

Related U.S. Application Data

[63] Continuation of Ser. No. 142,508, Oct. 25, 1993, abandoned.

[51] Int. Cl.$^6$ .................................................. C22C 13/02
[52] U.S. Cl. ........................ 420/562; 148/400; 148/405; 420/559; 420/561
[58] Field of Search ...................... 420/559, 561, 420/562; 148/400, 405; C22C 13/00, 13/02

[56] References Cited

U.S. PATENT DOCUMENTS

| | | | |
|---|---|---|---|
| 2,629,367 | 8/1953 | Smith et al. | 75/134 |
| 2,649,368 | 8/1953 | Smith et al. | 75/134 |
| 2,717,840 | 9/1955 | Bosch | 117/70 |
| 3,103,067 | 9/1963 | Dixon | 29/473.1 |
| 3,982,430 | 9/1976 | Pommellet et al. | 73/146 |
| 4,083,718 | 4/1978 | Murabayashi et al. | 75/134 |
| 4,214,903 | 7/1980 | Murabayashi et al. | 75/134 |
| 4,623,514 | 11/1986 | Arora et al. | 420/555 |
| 5,120,498 | 6/1992 | Cocks | 420/580 |
| 5,242,658 | 9/1993 | Stevens et al. | 420/557 |
| 5,248,476 | 9/1993 | Slattery et al. | 420/577 |

FOREIGN PATENT DOCUMENTS

| | | |
|---|---|---|
| 0136866A2 | 4/1985 | European Pat. Off. . |
| 0499452A1 | 8/1992 | European Pat. Off. . |
| 59-116357A | 7/1984 | Japan . |
| 59-41430A | 7/1984 | Japan . |
| 2-197396A | 8/1990 | Japan . |
| 2-197396 | 8/1990 | Japan . |

OTHER PUBLICATIONS

McCormack, et al., "Progress in the Design of New Lead–Free Solder Alloys," *JOM*, vol. 45, No. 7, Jul. 1993.
French, The Use of Indium in Fusible Alloys, Metal Industry (Mar. 1937), pp. 106–107.
Spengler, Contribution to the Knowledge of Binary and Multiple Systems of the B metals. The Quinary System Cd–Ge–In–Sn–Zn, Metall., vol. 8, p. 936, (1954) (See, e.g., FIG. 8).
Ludwick, Indium, pp. 7–151, The Indium Corporation of America (1959) (See, e.g., pp. 54–108 which relate to the Spengler article, cited above).
Manko, Solders and Soldering, pp. 115–123, McGraw–Hill Book Company (2nd ed. 1979).
Cerro De Pasco Corporation, Cerro Alloy Physical Data—Applications (1982).
Assembly Joining Handbook, Low Melting Temperature Solders, The Institute For Interconnecting and Packaging Electronic Circuits (Dec., 1983).
Standard Specification for Low Melting Point Alloys, ASTM, Designation: B 774–87 (1987).
The Indium Corporation of America, Indalloy Fusible Alloys, (1988).
The Indium Corporation of America, Indalloy Specialty Solders & Alloys, (1988).
Federal Specification, Solder; Tin Alloy, Tin–Lead Alloy, and Lead Alloy, QQ–S–571E (Interim Amendment 5 (ER) 28 Dec. 1989).
Safety in Soldering . . . , Lead Industries Association, Inc., (1990).
Stevens & White, Properties and Selection: Indium and Bismuth, Metals Handbook vol 2, (10th ed. 1990).
Soldering of Electronic Products, Lead Industries Association, Inc. (1991).
McCormack and Jin, Progress in the Design of New Lead–Free Solder Alloys, Journal of Metals, pp. 36–40 (Jul. 1993).

*Primary Examiner*—Peter Chin
*Assistant Examiner*—Sean Vincent
*Attorney, Agent, or Firm*—Fish & Neave; Douglas J. Gilbert; K. Iain McAusland

[57] ABSTRACT

A lead-free alloy suitable for soldering comprising from about 82% to about 90% tin, from about 4.5% to about 6% zinc, from about 3.5% to about 6% indium and from about 1% to about 5% bismuth. The melting temperature of the alloy is preferably below 190° C. and the alloy preferably has a pasty range of less than 10° C.

16 Claims, No Drawings

LEAD-FREE ALLOY CONTAINING TIN, ZINC, INDIUM AND BISMUTH

This is a continuation of application Ser. No. 8-142508, filed Oct. 25, 1993, entitled LEAD-FREE ALLOY CONTAINING TIN, ZINC, INDIUM AND BISMUTH now abandoned.

BACKGROUND OF THE INVENTION

The present invention relates to lead-free alloys for use in soldering. More particularly, the present invention relates to a lead-free solder composition comprising tin, zinc, indium and bismuth.

Different solder compositions have unique characteristics which make them suitable for particular applications. Two characteristics of a solder which are important to its use are melting temperature and melting range.

Melting temperature is one of the most important characteristics of a solder. The solder chosen for a particular use should have a low enough melting temperature that the melted solder does not damage any temperature-sensitive components that are to be joined. However, the melting temperature should also be high enough that the joint formed will not be affected by the operating temperature of the device or by subsequent soldering operations. In modern electronic applications, the temperature sensitivity of microelectronic components requires the use of solders at relatively low temperatures. In comparison, solders for joining and sealing pipes in plumbing operations are generally applied at much higher working temperatures because the components are not so temperature sensitive.

Another important characteristic of a solder is melting range. Pure elemental metals have a melting point. Most alloys, however, with the exception of eutectic compositions, melt over a range of temperatures. The alloy begins to melt at a temperature called the solidus but is not completely liquid until it reaches a higher temperature called the liquidus. The range between the solidus and the liquidus is referred to as the phase transformation range or "pasty" range. At temperatures within the "pasty" range, the alloy contains a mixture of solid and liquid phases containing different metal compositions. The solid phase contains higher melting point components and the liquid phase lower melting point components. Separation of the two components, called liquation, can alter the chemical composition of the alloy and the physical characteristics of the resulting joint.

Liquation can be particularly problematic in automated soldering operations in which components, such as circuit boards, are transported by a conveyer belt through the soldering apparatus. After the solder has been applied by a process such as a wave soldering, the conveyor carries the components into a cooling zone. As the soldered joints cool, the solder solidifies. If a solder with a large "pasty" range is used, then parts of the soldered joint will begin to solidify while some of the solder remains liquid. Vibration from the conveyor belt will then tend to separate the two metal phases. The vibration and liquation may disrupt the crystallization of the solder. The disrupted joint may be physically weakened and conduct electricity poorly or not at all resulting in a circuit which is prone to failure or completely non-functional. In such applications, it is much preferable to use a eutectic solder or a solder with a small "pasty" range.

Solders with small "pasty" ranges are also important in certain "step-soldering" operations where components are added to a device sequentially. These operations are also dependent upon solders with specific melting temperatures. In step soldering, the first components are joined using a relatively high melting temperature solder. When later components are joined, a lower melting temperature solder is used so that the earlier-soldered joints are not affected by the soldering operation. Further components may then be added using solder with an even lower melting temperature. The availability of solders with different melting points is critical to such step-soldering processes. It is also important, if several soldering steps are to be performed, for the melting ranges of the solders to be small.

Several solders are in common use in automated soldering operations. SN63 composed of 63% tin and 37% lead, is a eutectic alloy which melts precisely at 183° C. SN62 composed of 62% tin, 2% silver and 36% lead is a near eutectic alloy with a melting temperature of 179° C. SN60 composed of 60% tin and 40% lead has a solidus temperature of 183° C. and a liquidus temperature of 188° C. giving it a "pasty" range of 5° C. These solders are defined in Federal Specification QQ-S-571E Interim Amendment 5 (ER) 28 December 1989 (hereinafter "Federal Specification QQ-S-571E"). These solders have good characteristics for automated soldering. However, they suffer from the disadvantage that they contain lead.

Lead is known to have toxic effects. For this reason, rigorous limitations have been imposed upon the use of lead and lead-containing compositions. These limitations upon the use of lead-containing solders are most stringent in connection with plumbing where, until recently, the most popular plumbing solder was Sn50Pb50 which comprises 50% lead and 50% tin. Recent federal legislation banned the use of lead-containing solders in potable water systems forcing plumbers to stop using Sn50Pb50 and turn to lead-free solders.

Although plumbing is the most vivid example, other uses of lead-containing solders are also regulated. The United States Occupational Safety and Health Administration ("OSHA") has established a complex and extensive lead standard which regulates the permissible lead concentration in the air in the work place. In situations that result in high levels of lead in the air, OSHA regulations have strict requirements for minimizing employee exposure. Although most situations in which lead-containing solders are used do not produce lead concentrations high enough to trigger the OSHA standards, it is possible that stricter limitations upon the use of lead in solder might be imposed. Even in the absence of such regulations, reducing employee exposure to lead is still desirable. It would, therefore, be desirable to reduce the dependence upon lead-containing solders for certain applications by providing lead-free alternative solders.

It would also be desirable to provide lead-free solder compositions with relatively low melting temperatures suited to the assembly of electronic components.

It would further be desirable to provide lead-free solder compositions with relatively small "pasty" ranges suitable for use in automated soldering operations.

It would also be desirable to provide lead-free solder compositions which can replace currently used lead-containing solders such as SN63, SN62 and SN40.

SUMMARY OF THE INVENTION

It is an object of this invention to provide a solder composition for joining and sealing which is less toxic than common lead-containing solders.

It is a further object of this invention to provide lead-free solder compositions with relatively low melting temperatures suited to the assembly of electronic components. As used in the specification and claims, "lead-free" means that the lead content of the composition does not exceed the percentage of lead permitted as an impurity by the Federal Specification QQ-S-571E at paragraph 3.2.1.1.1.

It is still further an object of this invention to provide lead-free solder compositions with relatively small "pasty" ranges suited for use in automated soldering operations.

It is also an object of this invention to provide a lead-free solder which can replace currently used lead-containing solders such as SN63, SN62 and SN60.

In accordance with the present invention there are provided substantially lead-free solders comprising tin, zinc, indium and bismuth. The above and other objects and advantages of the present invention will be apparent upon consideration of the following detailed description.

DETAILED DESCRIPTION OF THE INVENTION

Applicants have found that compositions comprising tin, zinc, indium and bismuth are suitable for electronic soldering operations. In light of applicant's objective to provide lead-free substitute for SN63, SN62 and SN40, the preferred alloys are those with melting temperatures at about or below 190° C. and with a relatively small "pasty" range.

In one embodiment of the invention the composition comprises from about 82% to about 90% by weight tin, from about 4.5% to about 6% by weight zinc, from about 3.5% to about 6% by weight indium and from about 1.0 to 5.0% by weight bismuth. The preferred alloys comprise a greater or equal percentage by weight of zinc compared to indium and a greater or equal percentage by weight of indium compared to bismuth. A particular preferred composition is 86.5% by weight tin, 5.5% by weight zinc, 4.5% by weight indium and 3.5% by weight bismuth.

The high percentage of tin in this alloy is an advantage over previously known lead-free solders with similar melting temperatures. The high tin content imparts good wettability and mechanical properties to the alloy. These combined with the melting characteristics of the alloy make the alloy particularly suitable for electronic soldering applications.

The alloy compositions of the present invention can be prepared by techniques well known in the art. For example, measured (by weight) amounts of tin, zinc, indium and bismuth can be placed in a heating vessel. These metals can then be melted together using any conventional melting technique. When the metals have been heated to a temperature at which all the material is liquid, the mixture can be allowed to cool and cast into a suitable mold. After cooling, the alloy can be fabricated into suitable shapes such as rods and the like.

The following alloys were prepared and present illustrative but non-limiting embodiments of the present invention. Unless otherwise indicated in the examples and elsewhere in the specification and claims, all parts and percentages are by weight. The properties of the alloys were determined using differential scanning calorimetry instrumentation. The instrument traces a curve of the temperature of the sample as a function of its heat energy—a dip in the curve indicating the melting point or range of the sample. A sharp slope and narrow width to this dip indicates a small "pasty" range and is desirable for potentially useful solders.

The following embodiments illustrate the general rule describing the composition of the preferred embodiments, in which the alloys comprise a greater or equal percentage by weight of zinc compared to indium and a greater or equal percentage by weight of indium compared to bismuth.

EXAMPLE 1

An alloy with the composition 82% tin, 6% zinc, 6% indium and 6% bismuth has the following properties: solidus 177° C.; liquidus 185° C.; and "pasty" range 8° C.

EXAMPLE 2

An alloy with the composition 83% tin, 6% zinc, 6% indium and 5% bismuth has the following properties: solidus 180° C.; liquidus 186° C.; and "pasty" range 6° C.

EXAMPLE 3

An alloy with the composition 84% tin, 6% zinc, 5.5% indium and 4.5% bismuth has the following properties: solidus 181° C.; liquidus 187° C.; and "pasty" range 6° C.

EXAMPLE 4

An alloy with the composition 84% tin, 6% zinc, 5% indium and 5% bismuth has the following properties: solidus 182° C.; liquidus 188° C.; and "pasty" range 6° C.

EXAMPLE 5

An alloy with the composition 85% tin, 6% zinc, 5% indium and 4% bismuth has the following properties: solidus 183° C.; liquidus 188° C.; and "pasty" range 5° C.

EXAMPLE 6

An alloy with the composition 85% tin, 5% zinc, 5% indium and 5% bismuth has the following properties: solidus 180° C.; liquidus 186° C.; and "pasty" range 6° C.

EXAMPLE 7

An alloy with the composition 86.5% tin, 5.5% zinc, 4.5% indium and 3.5% bismuth has the following properties: solidus 185° C.; liquidus 188° C.; and "pasty" range 3° C.

EXAMPLE 8

An alloy with the composition 88% tin, 6% zinc, 5% indium and 1% bismuth has the following properties: solidus 188° C.; liquidus 191° C.; and "pasty" range 3° C.

EXAMPLE 9

An alloy with the composition 88% tin, 5% zinc, 4% indium and 3% bismuth has the following properties: solidus 185° C.; liquidus 188° C.; and "pasty" range 3° C.

EXAMPLE 10

An alloy with the composition 90% tin, 5% zinc, 4% indium and 1% bismuth has the following properties: solidus 190° C.; liquidus 192° C.; and "pasty" range 2° C.

As determined from the above examples, the alloys exhibiting the best melting characteristics comprise percentages of the component metals comprising a greater or equal percentage by weight zinc compared to indium and a greater or equal percentage by weight of indium compared to bismuth. Applicants have in addition determined that the compositions shown below in examples 11 and 12, while varying slightly from this general rule, nevertheless exhibit satisfactory melting characteristics.

EXAMPLE 11

An alloy with the composition 86.5% tin, 5.5% zinc, 3.5% indium and 4.5% bismuth has the following properties: solidus 183° C.; liquidus 189° C.; and "pasty" range 6° C.

EXAMPLE 12

An alloy with the composition 86.5% tin, 4.5% zinc, 5.5% indium and 3.5% bismuth has the following properties: solidus 180° C.; liquidus 186° C.; and "pasty" range 6° C.

Applicant's investigations indicate that in addition to the above described general rule, alloys should also comprise at least about 4.5% by weight zinc in order to obtain satisfactory melting characteristics.

The following alloys were prepared and exhibit poor melting characteristics:

86.5% Sn, 3.5% Zn, 5.5% In & 4.5% Bi;
86.5% Sn, 3.5% Zn, 4.5% In & 5.5% Bi;
86.5% Sn, 4.5% Zn, 3.5% In & 5.5% Bi;
88% Sn, 4% Zn, 4% In & 4% Bi;
90% Sn, 4% Zn, 3% In & 3% Bi;
91% Sn, 3% Zn, 3% In & 3% Bi.

Although the preferred alloys have been described with regard to their utility for soldering of electronic components they can be used in many of the applications for which solders are used. The low melting points of these solders make them particularly useful where temperature sensitive elements are to be joined or sealed.

While the invention has been explained in relation to its preferred embodiments, it is to be understood that various modifications thereof will become apparent to those skilled in the art. The foregoing disclosure is not intended or to be construed to limit the present invention, or to otherwise exclude any such other embodiments, adaptations, variations and equivalent arrangements, the present invention being limited only by the claims appended hereto and the equivalents thereof.

What is claimed is:

1. A lead-free alloy comprising at least about 82% by weight tin, at least about 4.5% by weight zinc but not more than about 6% by weight zinc, at least about 3.5% by weight indium but not more about the percentage by weight of zinc, and at least about 1% by weight bismuth but not more than about the percentage by weight of indium.

2. The lead-free alloy of claim 1 comprising about 82% by weight tin, about 6% by weight zinc, about 6% by weight indium and about 6% by weight bismuth.

3. The lead-free alloy of claim 1 comprising about 83% by weight tin, about 6% by weight zinc, about 6% by weight indium and about 5% by weight bismuth.

4. The lead-free alloy of claim 1 comprising about 84% by weight tin, about 6% by weight zinc, about 5.5% by weight indium and about 4.5% by weight bismuth.

5. The lead-free alloy of claim 1 comprising about 84% by weight tin, about 6% by weight zinc, about 5% by weight indium and about 5% by weight bismuth.

6. The lead-free alloy of claim 1 comprising about 85% by weight tin, about 5% by weight zinc, about 5% by weight indium and about 5% by weight bismuth.

7. The lead-free alloy of claim 1 comprising about 85% by weight tin, about 6% by weight zinc, about 5% by weight indium and about 4% by weight bismuth.

8. The lead-free alloy of claim 1 comprising about 86.5% by weight tin, about 5.5% by weight zinc, about 4.5% by weight indium and about 3.5% by weight bismuth.

9. The lead-free alloy of claim 1 comprising about 88% by weight tin, about 6% by weight zinc, about 5% by weight indium and about 1% by weight bismuth.

10. The lead-free alloy of claim 1 comprising about 88% by weight tin, about 5% by weight zinc, about 4% by weight indium and about 3% by weight bismuth.

11. The lead-free alloy of claim 1 comprising about 90% by weight tin, about 5% by weight zinc, about 4% by weight indium and about 1% by weight bismuth.

12. A lead-free alloy comprising about 86.5% by weight tin, about 5.5% by weight zinc, about 3.5% by weight indium and about 4.5% by weight bismuth.

13. A lead-free alloy comprising about 86.5% by weight tin, about 4.5% by weight zinc, about 5.5% by weight indium and about 3.5% by weight bismuth.

14. A lead-free alloy comprising at least about 82% by weight tin, at least about 4.5% by weight zinc, at least about 3.5% by weight indium but not more than about the percentage by weight of zinc, and at least about 1% by weight bismuth but not more than about the percentage by weight of indium, wherein the lead-free alloy has a solidus temperature less than about 190° C.

15. The lead-free alloy of claim 14 having a liquidus temperature less than about 190° C.

16. The lead-free alloy of claim 14 having a pasty range of less than about 10° C.

* * * * *